(12) United States Patent
Wang et al.

(10) Patent No.: US 12,481,206 B2
(45) Date of Patent: Nov. 25, 2025

(54) LASER PROJECTOR LAMP WITH MULTIPLE PROJECTION EFFECTS

(71) Applicant: ZHONGSHAN BOLANG ELECTRONIC TECHNOLOGY CO., LTD, Zhongshan (CN)

(72) Inventors: Gang Wang, Zhongshan (CN); Ligao Xiong, Zhongshan (CN); Shaoqi Ji, Zhongshan (CN)

(73) Assignee: ZHONGSHAN BOLANG ELECTRONIC TECHNOLOGY CO., LTD, Zhongshan (CN)

( * ) Notice: Subject to any disclaimer, the term of this patent is extended or adjusted under 35 U.S.C. 154(b) by 476 days.

(21) Appl. No.: 18/084,563

(22) Filed: Dec. 20, 2022

(65) Prior Publication Data

US 2024/0201570 A1    Jun. 20, 2024

(51) Int. Cl.
*G03B 21/14*       (2006.01)
*G03B 21/20*       (2006.01)

(52) U.S. Cl.
CPC ....... *G03B 21/145* (2013.01); *G03B 21/2066* (2013.01)

(58) Field of Classification Search
CPC  G03B 21/145; G03B 21/2066; G03B 21/001; G03B 21/2033
USPC ......................................................... 353/119
See application file for complete search history.

(56) References Cited

U.S. PATENT DOCUMENTS

| | | | |
|---|---|---|---|
| 11,242,979 B2* | 2/2022 | Wang | F21V 14/065 |
| 11,454,375 B1* | 9/2022 | Xiong | G02B 27/0972 |
| 2016/0026073 A1* | 1/2016 | Zhang | G03B 21/2033 |
| | | | 353/101 |
| 2016/0209013 A1* | 7/2016 | Chien | F21V 14/02 |
| 2017/0082254 A1* | 3/2017 | Zhang | A63H 27/10 |
| 2021/0164628 A1* | 6/2021 | Zheng | F21S 10/002 |
| 2022/0299858 A1* | 9/2022 | Li | G02B 5/1814 |

FOREIGN PATENT DOCUMENTS

DE         202021103588 U1 *  9/2021  ........... G03B 21/001

* cited by examiner

*Primary Examiner* — Magda Cruz
(74) *Attorney, Agent, or Firm* — Jose Cherson Weissbrot

(57) ABSTRACT

Disclosed is a novel laser projector lamp with multiple projection effects, which includes a housing body, a surface lid and a support. The support is arranged at a bottom of the housing body and used for supporting the housing body. The surface lid is arranged on one side of the housing body. The housing body includes a first projection module and a second projection module respectively forming a first light path and a second light path which do not interfere with each other and are perpendicular to each other. The surface lid is provided with a first projection area and a second projection area, a star point pattern formed by the first projection module is projected by the first projection area, and a water wave or cloud pattern formed by the second projection module is projected by the second projection area.

9 Claims, 4 Drawing Sheets

LASER PROJECTOR LAMP WITH MULTIPLE PROJECTION EFFECTS

TECHNICAL FIELD

The utility model relates to the technical field of lamps creating atmospheres, and more particularly relates to a novel laser projector lamp with multiple projection effects.

BACKGROUND

With the development of society, people have higher requirements for standard of living, and more people start to pursue living quality. For example: people start to focus on lighting lamps, but lighting lamps at current market only have a lighting function, emit single lamplight elements and produce a monotonous lamplight atmosphere, and as a result, users are likely to feel visual aesthetic fatigue.

With increasing of the living quality of people, people put forward more requirements for the lamplight atmosphere, and thus the lighting lamps only emitting single lamplight are far from satisfying the requirements of people. People start to focus on lighting lamps capable of creating wonderful lamplight atmospheres, and thus, a kind of lamps capable of creating a plurality of wonderful lamplight atmospheres are urgently needed at the market so as to satisfy requirements of customers.

SUMMARY

Based on defects in the prior art, the utility model aims to provide a novel laser projector lamp with multiple projection effects. Specifically, 2 projection modules not interfering with each other are adopted to form a cyclic rotating starry pattern and a cyclic flowing water wave or cloud pattern respectively, which brings different visual effects and enjoyments to users.

In order to achieve the above purpose, the utility model adopts a following technical scheme:

A novel laser projector lamp with multiple projection effects includes a housing body, a surface lid and a support. The support is arranged at a bottom of the housing body and used for supporting the housing body. The surface lid is arranged on one side of the housing body. The housing body includes a first projection module and a second projection module. The first projection module and the second projection module in the housing body respectively form a first light path and a second light path which do not interfere with each other and are perpendicular to each other. The surface lid is provided with a first projection area and a second projection area, a star point pattern formed by the first projection module is projected by the first projection area, and a water wave or cloud pattern formed by the second projection module is projected by the second projection area.

It needs to be explained that the first projection module includes a first laser light source, a condenser cup, a color disk, a lens and a reflection assembly. The first laser light source is opposite to the reflection assembly. The condenser cup, the color disk and the lens are sequentially arranged between the first laser light source and the reflection assembly. An included angle between the first laser light source and the reflection assembly ranges from 30° to 60°. The second projection module is arranged between the condenser cup and the lens. The first light path generated by the first laser light source passes through the reflection assembly to be outwards projected from the first projection area.

It needs to be explained that the reflection assembly includes a stepping motor and a reflector, and one side of the reflector is inserted and connected into a rotating shaft of the stepping motor.

It needs to be explained that the color disk is arranged between the first laser light source and the condenser cup, or arranged between the condenser cup and the lens.

It needs to be explained that the second projection module includes a second laser light source, a condenser and a spherical lens which are sequentially arranged. The second light path generated by the second laser light source passes through the spherical lens to be outwards projected from the second projection area.

It needs to be explained that the second projection area is a hemisphere-like hump matched with the spherical lens in shape.

It needs to be explained that an inner surface of the condenser cup is provided with a plurality of reflecting surfaces.

It needs to be explained that the condenser is a transparent sheet with a surface provided with a continuous irregular concave-convex surface.

It needs to be explained that an included angle is 45°.

The utility model has beneficial effects:

1. The 2 independent projection modules generating the light paths not interfering with each other are adopted and may perform projection according to different needs.
2. Each independent module represents one projection effect, and different effects such as a starry effect, an iridescent cloud effect and a water wave effect are respectively represented.
3. The structure is compact, usage is convenient, and the utility model is suitable for being used in many scenes.

DETAILED DESCRIPTION

The utility model is further described by combining drawings below. It needs to be explained that examples give detailed implementation modes and specific operation processes based on technical schemes, but a scope of protection of the utility model is not limited to the examples.

Figure 1:
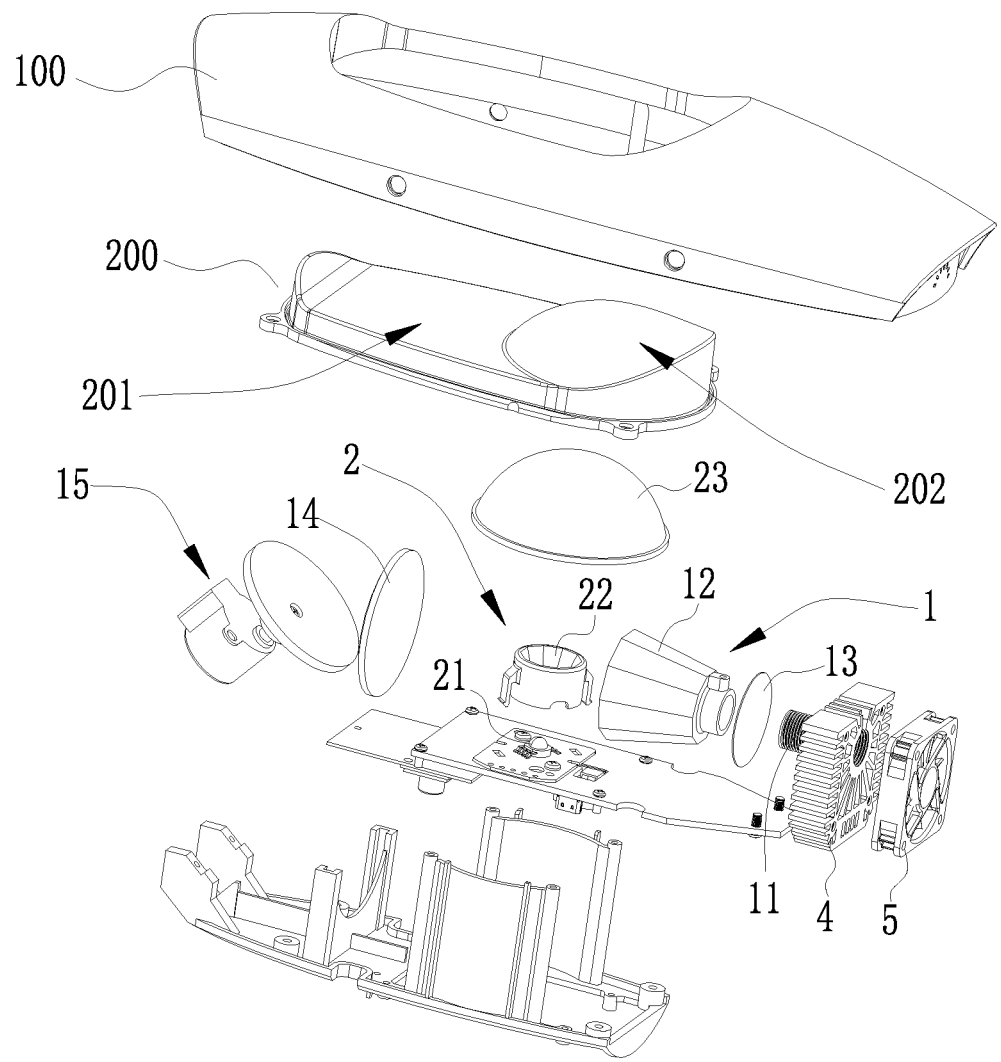
FIG. 1 is a schematic exploded structure diagram of the utility model.

As shown in FIG. 1, the utility model discloses a novel laser projector lamp with multiple projection effects, which includes a housing body 100, a surface lid 200 and a support. The support is arranged at a bottom of the housing body 100 and used for supporting the housing body 100. The surface lid 200 is arranged on one side of the housing body 100. The housing body 100 includes a first projection module 1 and a second projection module 2. The first projection module 1 and the second projection module 2 in the housing body 100 respectively form a first light path and a second light path which do not interfere with each other and are perpendicular to each other. The surface lid 200 is provided with a first projection area 201 and a second projection area 202, a star point pattern formed by the first projection module 1 is projected by the first projection area 201, and a water wave or cloud pattern formed by the second projection module 2 is projected by the second projection area 202.

It needs to be explained that laser light sources arranged in the first projection module and the second projection module of the utility model may adopt monochromatic light sources or polychromatic light sources in the prior art.

It needs to be indicated that the laser light sources of the utility model may be replaced with other light sources in the prior art.

Furthermore, as shown in FIG. 1, the first projection module 1 of the utility model includes a first laser light source 11, a condenser cup 12, a color disk 13, a lens 14 and a reflection assembly 15. The first laser light source 11 is opposite to the reflection assembly 15. The condenser cup 12, the color disk 13 and the lens 14 are sequentially arranged between the first laser light source 11 and the reflection assembly 15. An included angle between the first laser light source 11 and the reflection assembly 15 ranges from 30° to 60°. The second projection module 2 is arranged between the condenser cup 12 and the lens 14. The first light path generated by the first laser light source 11 passes through the reflection assembly 15 to be outwards projected from the first projection area 201.

Figure 2:
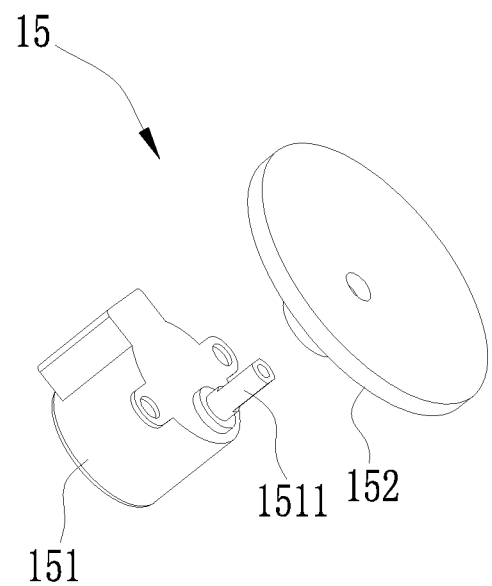
FIG. 2 is a schematic structure diagram of a reflection assembly in FIG. 1.

Furthermore, as shown in FIG. 2, the reflection assembly 15 of the utility model includes a stepping motor 151 and a reflector 152. One side of the reflector 152 is inserted and connected into a rotating shaft 1511 of the stepping motor 151, and synchronous rotation of the reflector is realized by the stepping motor.

Furthermore, the color disk of the utility model is arranged between the first laser light source and the condenser cup, or arranged between the condenser cup and the lens. Namely, a set position of the color disk is not fixed and may be decided according to actual needs. But, those skilled in the art should know that when the color disk is arranged between the condenser cup and the lens, an area of the color disk needs to be larger than that of an opening of the condenser cup. It needs to be indicated that no matter which above position the color disk is arranged in, a projection effect of the first projection module is not influenced.

Moreover, the color disk of the utility model may be a single-color disk or a multi-color disk.

Moreover, a plurality of reflecting surfaces are arranged on a surface of the reflector to make the first projection module of the utility model better form a starry effect.

Figure 3:
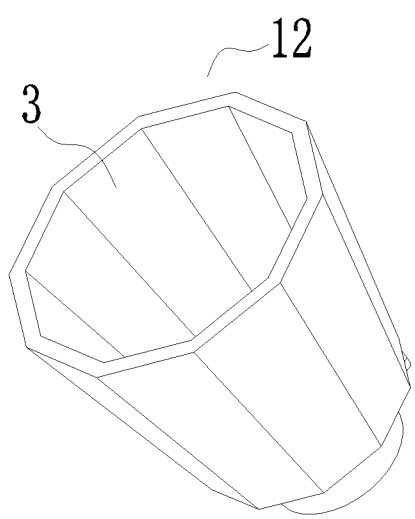
FIG. 3 is a schematic structure diagram of a condenser cup in FIG. 1.

Furthermore, as shown in FIG. 3, an inner surface of the condenser cup 12 of the utility model is provided with a plurality of reflecting surfaces 3.

As a preferable technical scheme, a rotation or static state may be selected by the stepping motor in the utility model according to different projection needs. Namely, when the stepping motor drives the reflector to rotate, a plurality of white points formed by projecting, via the reflector, a laser emitted by the first laser light source rotate together to form a cyclic rotating starry effect; and when the stepping motor stops rotating, the plurality of the white points formed by projecting, via the reflector, the laser emitted by the first laser light source are static and are maintained at assigned positions to form a static starry effect.

To improve a reflection effect, the reflector is provided with a reflecting area with a sunken cambered surface.

Furthermore, as shown in FIG. 1, the reflection assembly is obliquely arranged with a central axis of the first laser light source as a datum, and a certain projection included angle is set between the first laser light source and the reflection assembly to achieve the projection effects.

Furthermore, an included angle between a laser assembly and the reflection assembly ranges from 30° to 60° to achieve a better projection effect.

As a preferable technical scheme, an included angle is 45° to achieve the best projection effect.

In addition, as shown in FIG. 1, the first laser light source 11 is connected to a heat sink 4 and a cooling fan 5, thereby guaranteeing a cooling effect of the first laser light source.

Furthermore, as shown in FIG. 1, the second projection module 2 of the utility model includes a second laser light source 21, a condenser 22 and a spherical lens 23 which are sequentially arranged. The second light path generated by the second laser light source 21 passes through the spherical lens 23 to be outwards projected from the second projection area 202.

As a preferable technical scheme, a condenser cup of a structure the same with the previous structure may be selected as the condenser used in the second projection module of the utility model; or in the other preferable scheme, a transparent sheet with a surface provided with a continuous irregular concave-convex surface may be selected as the condenser.

It needs to be further indicated that no matter which above structure the condenser selects, a water wave or iridescent cloud effect formed by the second projection module is not influenced.

Furthermore, as shown in FIG. 1, the second projection area 202 of the utility model is a hemisphere-like hump matched with the spherical lens 23 in shape.

It needs to be explained that the utility model further includes a control circuit, and the control circuit is electrically connected to the first projection module and the second projection module.

It needs to be indicated that the control circuit in the utility model adopts a universal control circuit in the prior art. Furthermore, the control circuit is used for controlling on-off states of the first projection module and the second projection module, and in addition, may further control a projection duration, a projection mode and like of the projection modules.

Figure 4:
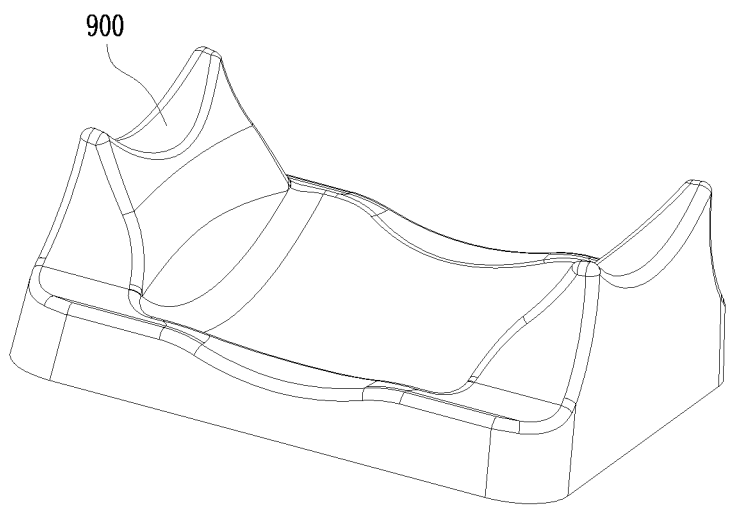
FIG. 4 is a schematic structure diagram of a base for containing the utility model.
Figure 5:
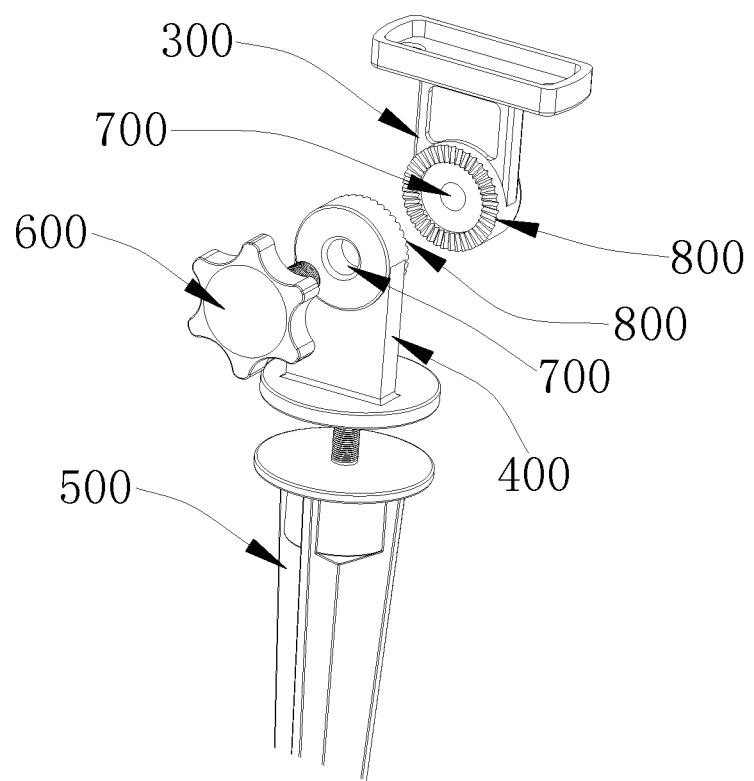
FIG. 5 is a schematic structure diagram of a ground socket for containing the utility model.

As shown in FIG. 4 and FIG. 5, to adjust a pitching projection angle of the utility model, the support of the utility model may adopt a base 900 connected to the housing body, or adopt a ground socket 500. When the ground socket 500 is adopted, the ground socket structurally includes an installation carrier 300 connected to the housing body, a connecting rod 400 connected to the installation carrier 300 and an angle adjusting knob 600. Furthermore, the connecting rod 400 and the installation carrier 300 are respectively provided with position-corresponding adjusting holes 700 the same in size, and the angle adjusting knob 600 is in screw joint into the adjusting holes 700.

When the pitching projection angle needs to be adjusted, the adjusting knob is rotated to be loosened so that the housing body can be swung up and down for pitching angle adjustment, and after adjustment, the adjusting knob is rotated to be tightened.

Figure 6:
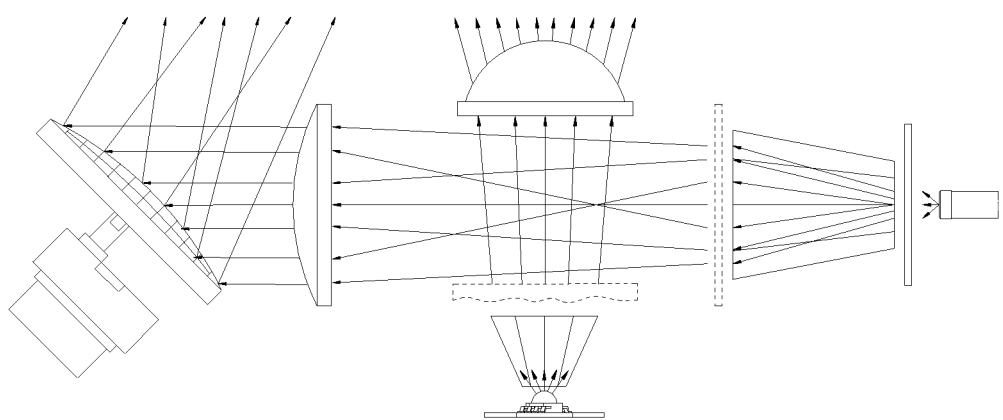
FIG. 6 is a schematic diagram of light paths of a first laser module and a second laser module of the utility model.

Furthermore, to realize fine adjustment of a pitching angle, as shown in FIG. 6, surface peripheries of the connecting rod 400 and the installation carrier 300 are respectively provided with engaged racks 800. A distance between the adjacent racks 800 is equal to each angular distance, and thus, one angle can be adjusted after one rack 800 is rotated, thereby achieving accurate control over the pitching angle.

Furthermore, FIG. 6 shows the first light path and the second light path formed by the first projection module and the second projection module of the utility model respectively. It needs to be indicated that structures defined by dotted lines in the drawing are a selectable color disk position and a transparent sheet and condenser replaceable structure previously mentioned in the technical scheme.

Example 1

Application Method of First Projection Module

During usage, a support installs the utility model at an assigned position, and then, the utility model can be turned on. A laser of a first laser light source (a monochromatic light source or a polychromatic light source) is emitted, sequentially passes through a color disk (a single-color disk or a multi-color disk), a condenser cup and a lens and then arrives at a reflector of a reflection assembly, and is finally reflected by the reflector to be outwards projected to a needed area from a first projection area on a surface lid. As the other scheme, the laser of the first laser light source may also sequentially pass through the condenser cup, the color disk (the single-color disk or the multi-color disk) and the lens, and then arrives at the reflector of the reflection assembly.

According to the above description, when a stepping motor of the reflection assembly rotates, the reflector rotates together, a plurality of light spots emitted by a plurality of tiny lenses on the reflector rotate at the same time to form a dynamic projection effect, and namely, the projection of the first projection module generates a cyclic starry effect. Or, when the stepping motor is static, the plurality of light spots emitted by the plurality of tiny lenses are maintained at assigned positions, thereby forming a static projection effect.

Example 2

Application Method of Second Projection Module

During usage, a support installs the utility model at an assigned position, and then, the utility model can be turned on. A laser of a second laser light source (a monochromatic light source or a polychromatic light source) is emitted, sequentially passes through a condenser and a spherical lens and then is outwards projected to a needed area from a second projection area (a hemisphere-like hump) on a surface lid.

Those skilled in the art can make other corresponding changes and transformations according to the above described technical schemes and concepts, while all the changes and transformations should belong to a scope of protection of claims of the disclosure.

What is claimed is:

1. A novel laser projector lamp with multiple projection effects, comprising a housing body, a surface lid and a support, wherein the support is arranged at a bottom of the housing body and used for supporting the housing body, and the surface lid is arranged on one side of the housing body; and the housing body comprises a first projection module and a second projection module, the first projection module and the second projection module in the housing body respectively form a first light path and a second light path which do not interfere with each other and are perpendicular to each other, the surface lid is provided with a first projection area and a second projection area, a star point pattern formed by the first projection module is projected by the first projection area, and a water wave or cloud pattern formed by the second projection module is projected by the second projection area, and wherein the first projection module comprises a first laser light source, a condenser cup, a color disk, a lens and a reflection assembly, the first laser light source is opposite to the reflection assembly, the condenser cup, the color disk and the lens are sequentially arranged between the first laser light source and the reflection assembly, and an included angle between the first laser light source and the reflection assembly ranges from 30° to 60°, and the second projection module is arranged between the condenser cup and the lens, and the first light path generated by the first laser light source passes through the reflection assembly to be outwards projected from the first projection area.

2. The novel laser projector lamp with the multiple projection effects according to claim 1, wherein the reflection assembly comprises a stepping motor and a reflector, and one side of the reflector is inserted and connected into a rotating shaft of the stepping motor.

3. The novel laser projector lamp with the multiple projection effects according to claim 1, wherein the color disk is arranged between the first laser light source and the condenser cup, or arranged between the condenser cup and the lens.

4. The novel laser projector lamp with the multiple projection effects according to claim 1, wherein the second projection module comprises a second laser light source, a condenser and a spherical lens which are sequentially arranged, and a second light path generated by the second laser light source passes through the spherical lens to be outwards projected from the second projection area.

5. The novel laser projector lamp with the multiple projection effects according to claim 4, wherein the second projection area is a hemisphere-like hump matched with the spherical lens in shape.

6. The novel laser projector lamp with the multiple projection effects according to claim 4, wherein the condenser is a transparent sheet with a surface provided with a continuous irregular concave-convex surface.

7. The novel laser projector lamp with the multiple projection effects according to claim 1, wherein an inner surface of the condenser cup is provided with a plurality of reflecting surfaces.

8. The novel laser projector lamp according to claim 1, wherein an included angle is 45°.

9. The novel laser projector lamp with the multiple projection effects according to claim 1, wherein the second projection module comprises a second laser light source, a condenser and a spherical lens which are sequentially arranged, and a second light path generated by the second laser light source passes through the spherical lens to be outwards projected from the second projection area.

* * * * *